United States Patent [19]
Cederstrand et al.

[11] 3,920,993
[45] Nov. 18, 1975

[54] PIGGYBACK OPTICAL BENCH
[75] Inventors: Carl N. Cederstrand, Brea; Jack J. Keegan, Fullerton, both of Calif.
[73] Assignee: Beckman Instruments, Inc., Fullerton, Calif.
[22] Filed: Sept. 18, 1974
[21] Appl. No.: 506,984

[52] U.S. Cl. .................. 250/343; 250/345; 356/51
[51] Int. Cl.² ......................................... G01N 21/26
[58] Field of Search .......................... 250/343–346, 250/373, 578; 356/51, 201, 204, 205, 206

[56] References Cited
UNITED STATES PATENTS
3,820,901  6/1974  Kreuzer ......................... 250/345 X
3,860,344  1/1975  Garfunkel ..................... 250/345 X Primary Examiner—Davis L. Willis
Attorney, Agent, or Firm—R. J. Steinmeyer; P. R. Harder

[57] ABSTRACT

An optical bench having a gas flow cell with an infrared source at one end and an infrared sensor at the other end is provided with an attachment or "piggyback" for determining the concentration of a second constituent or pollutant in a sample. The attachment comprises a sensor inserted into the gas cell adjacent to the end toward the infrared source so that a beam of radiant energy falls directly upon the inserted sensor. The invention is particularly well suited for determining the concentration of a pollutant which occurs in greater concentration or is more highly absorptive of radiant energy than that of the pollutant for which the optical bench was originally designed.

11 Claims, 2 Drawing Figures

PIGGYBACK OPTICAL BENCH

BACKGROUND OF THE INVENTION

Nondispersive, infrared absorption-type analyzers for molecular gaseous pollutants have been described having a source of gas to be analyzed, a flow cell for the gas, a detector and a filter having a filter characteristic appropriate to the gaseous pollutant to be analyzed. One such analyzer is described in U.S. Pat. No. 3,562,522 issued to Cederstrand et al. Since the filter must be appropriate to the gaseous pollutant to be analyzed, replacement of the filter is necessary in order to analyze the sample with respect to a different pollutant. It is frequently desirable to be able to analyze for two different pollutants without being required to make changes in the apparatus. Moreover, it is often desirable to be able to analyze for two different pollutants simultaneously, especially two different pollutants such as carbon monoxide and carbon dioxide which differ considerably both in the degree of absorption of infrared radiation and the location of their absorption bands. In a copending application of Carl N. Cederstrand and Charles A. Keenan, Ser. No. 491,672 filed on or about July 25, 1974 an optical bench has been described having radiation sensors mounted back to back in a rotatable mounting adapted to expose one or the other to radiation so that by rotating the mounting an analysis may be made selectively for one pollutant or another. Such an arrangement does not permit analyzing for both pollutants simultaneously and is not suitable for gases of greatly differing absorptions.

It is accordingly an object of the invention to provide relatively inexpensive, compact, easily operated and adjusted analysis apparatus which permits simultaneous analysis for two different pollutants which differ considerably in degree of absorption of radiant energy.

It is also an object of the invention to provide an arrangement for modifying an existing optical bench to permit analysis for a second pollutant by means of the same optical bench, where the second pollutant is a much higher degree of absorption than that for which the optical bench was originally designed.

Other and further objects, features and advantages of the invention will become apparent as the description proceeds.

SUMMARY OF THE INVENTION

In carrying out the invention in accordance with a preferred form thereof a standard optical bench such as that described, for example, in U.S. Pat. No. 3,562,522 issued to Cederstrand et al. is modified by drilling a hole in the flow cell or air sample chamber close to the radiation transmitting window which is nearest to the source of radiant energy and inserting a second radiation detector there for response to a pollutant which is highly absorbant of radiant energy. In such optical benches there is normally an elongated flow cell with radiation transmitting windows at the ends and a source of radiation beyond one window and the normally provided radiation detector beyond the other window so that the normally provided detector is responsive to radiation which passes through both end windows and the entire length of the flow cell so as to provide an opportunity for more absorption than if there were only a short flow cell. Since carbon dioxide in auto exhaust is highly absorbant in comparison with carbon monoxide, adequate response is obtained by placing the carbon dioxide detector therefor within the flow cell relatively close to the radiation transmitting window which is nearest the source of radiation.

An attachment for an additional highly absorbant pollutant may be provided in an optical bench which is designed for normally analyzing for a single weakly absorbing pollutant such as carbon monoxide. However, the attachment of the present invention may also be employed in optical benches such as that described in the aforesaid copending application Ser. No. 491,672 having a rotatable alternately positioned dual sensor unit for alternately analyzing for pollutants such as carbon monoxide and hydrocarbons, for example, to permit also analyzing for carbon dioxide.

A better understanding of the invention will be afforded by the following detailed description considered in conjunction with the accompanying drawings.

DRAWINGS

In the drawings:

FIG. 1 is a schematic diagram partially in section of an optical bench designed for determination of the concentration of a pollutant such as carbon monoxide, for example, with an attachment in accordance with the invention for enabling determination to be made also of the concentration of a pollutant which is highly absorptive of infrared radiant energy such as carbon dioxide, for example, and FIG. 2 is a diagram corresponding to FIG. 1 illustrating an optical bench arranged for determination of the concentration of carbon dioxide in addition to determination alternately of two other pollutants such as carbon monoxide and hydrocarbons, for example.

Like reference characters are utilized throughout the drawing to designate like parts.

DETAILED DESCRIPTION

Figure 1:
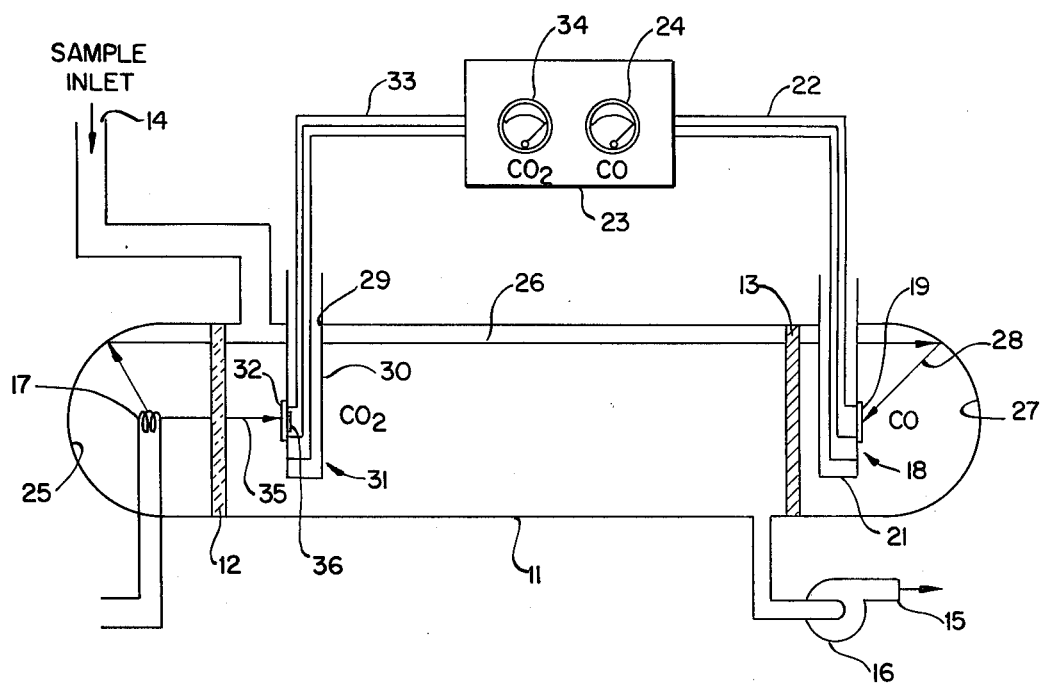

In the embodiment illustrated in FIG. 1, an optical bench is utilized having an elongated sample gas chamber for an air flow cell 11 closed at one end by a rigid infrared radiation transmitting window 12 and at the other end by an infrared radiation transmitting window 13 which need not necessarily be rigid. The air flow cell 11 has a sample inlet opening 14 and an outlet opening 15, each preferably near one of the radiation transmitting windows 12 or 13. If needed in the application for which the optical bench is employed, a suction pump or exhaust fan 16 is provided for drawing the gas to be analyzed through the flow cell 11. To the left of the rigid window 12 a source of infrared radiation is provided which may take the form of an electrically pulsed filament 17. To the right of the window 13 a sensor 18 is provided. In this manner each of the elements 17 and 18 is beyond one of the windows and outside the flow cell 11 so that infrared radiation traverses the entire length of the flow cell 11 in passing through the window 12 from the source 17 to reach the sensor 18 after passing through the window 13.

The sensor 18 does not constitute a part of the present invention but may, for example, consist of a thermistor compensated for ambient temperature variations with differentially connected light and dark flakes such as described in the copending application Ser. No. 491,672, not shown in detail in FIG. 1. The sensor 18 is represented schematically as having a filter 19, in a holder or enclosure 21. For connecting thermistor flakes to suitable electrical circuitry, a three-wire cable 22 is brought from the sensing unit 18 to an amplifier and instrument casing 23 having an instrument 24 mounted therein. The instrument 24 is coupled in a conventional manner to the sensor 18 and may be of the deflecting pointer or curve drawing type to produce indications of the output of the sensor 18 which is dependent upon the absorption of infrared energy in the flow cell 11 by the gas therein.

It will be understood that the filter characteristics of the filter 19 are chosen to be responsive to the particular pollutant or molecular gaseous constituent, the concentration of which is to be determined and indicated by the instrument 24. If the apparatus is designed for determination of the concentration of carbon monoxide the filter 19 is chosen to transmit those wavelengths of infrared radiant energy that are absorbed by carbon monoxide in the flow cell 11.

Preferably a spherical or parabolic mirror 25 is mounted in an enclosure at the left of the window 12 for concentrating the radiation from the infrared source 17 along parallel beams such as a beam 26 in the flow cell 11. Likewise, a suitable mirror with a parabolic or spherical surface 27 is mounted in an enclosure to the right of the window 13 for concentrating the radiation in radial paths 28 passing through the filter 19 to fall upon the light flake in the sensor 18. The walls of the enclosure 21 of the sensor unit 18 are closed except at the opening for the filter 19 so that direct radiation does not affect the thermistor detector, but only that reflected along the radial beams 28.

The portions of the apparatus thus far described have heretofore been described and do not in themselves constitute the present invention. However, in accordance with the invention existing apparatus may be modified by drilling a hole 29 in the circumferential wall of the flow cell 11 near the rigid filter window 12 and inserting the holder or enclosure 30 of a separate, additional sensor unit 31, also consiting of a compensated thermistor detector 36 having light and dark flakes, connected differentially, with the light flake mounted behind an opening for a filter 32 in the holder 30. The filter 32 is selected to have the characteristics of transmitting wavelengths of infrared radiation appropriate for the detection of a molecular gaseous constituent or air pollutant which strongly absorbs infrared radiation, such as carbon dioxide, for example. Corresponding to the electrical connections of the sensor unit 18, a three-wire cable 33 is provided for coupling the sensor 31 and an instrument 34 through suitable electronic circuitry and amplifying elements. The instrument 34 may also be of the deflecting pointer or curve drawing type, for indicating concentration of the strongly absorbing pollutant, such as carbon dioxide. Thus, the instruments 24 and 34 may be utilized simultaneously for producing pointer indications of carbon monoxide and carbon dioxide concentration or records thereof or continuously drawn chart curves according to the form taken by the instruments 24 and 34.

The holder 30 for the carbon dioxide sensor unit 31 may be mounted in any suitable position in proximity to the rigid infrared radiation transmitting window 12. It may be mounted between the window 12 and the sample inlet 14. However, it is preferable to have the inlet 14 between the window 12 and the container 31 for the carbon dioxide sensor in order to obviate the slight delay represented by the diffusion time of the sample entering the flow cell 11 from the inlet 14.

Owing to the fact that the unit 31 is relatively close to the window 12, any vibration or deflection of the window 12 would produce a relatively large variation in the absorption path length between the window 12 and the filter 32. It is therefore essential to employ a material for the window 12 which is rigid, such as sapphire, for example, which readily transmits infrared radiation. Sapphire may also be employed for the window 13. However, owing to the fact that the path between windows 12 and 13 is relatively long, slight deflections in either window are less significant as to the effect on the length of the radiant energy absorption path and the window 13 may, if desired as in conventional optical benches, be composed of a suitable synthetic plastic material which transmits infrared radiation such as polytetrafluoroethylene sheets, for example.

With respect to the functioning of the sensor unit 18, the optical bench in FIG. 1 operates in a conventional manner with radiation from the source 17 in the form of parallel beams 26 passing through the windows 12 and 13 and being reflected by the focusing mirror 27 upon the radiation detector of the unit 18. Variations in the concentration of a pollutant such as carbon monoxide in the flow chamber 11 will result in variations in the absorption of infrared radiation in the wavelength bands of the infrared spectrum characteristic of carbon monoxide, thereby causing variations in the output of the detector in the sensor 18 and variations in the response of the instrument 24 to provide a measure of the concentration of the carbon monoxide.

It will be observed from the location of the filter 32 of the unit 31 toward the window 12 that the sensor unit 31 is affected by direct radiation along a path in the form of a beam 35 transmitted through the window 12 and directly entering the filter 32 to fall upon the detector in the unit 31. Moreover, the length of the path 35 is relatively short so that there is relatively little polluted air or gas in the space traversed by the beam 12 and relatively less absorption of radiant energy can take place than in the case of the longer paths between the windows 12 and 13. However, this is permissible in the case of a pollutant which highly absorbs radiant energy such as carbon dioxide, for example. Moreover, the concentration of carbon dioxide is ordinarily relatively large in a gas sample of automobile exhaust gas, for example. Consequently the sensitivity of the sensor 31 is aided both by the high degree of absorption of a pollutant such as carbon dioxide and by the fact that carbon dioxide occurs in relatively large concentration in comparison with all other pollutants such as carbon monoxide to which the unit 18 is intended to be responsive.

Although the supplementary or piggyback detector unit 31 for response to direct radiation has been shown as mounted in a conventional optical bench normally having only one pollutant detector as shown in FIG. 1, the invention is not limited thereto and may also be mounted in other types of optical benches. It may be mounted in an optical bench shown in FIG. 2 having a dual detector 41 for alternately determining concentrations of two different pollutants, such as carbon monoxide and unburned hydrocarbons, for example. The dual sensor 41 shown in FIG. 2 may be similar to that shown in FIG. 3 of the copending application Ser. No. 491,672 and the carbon dioxide sensor unit 31 is like that shown in FIG. 1 of the present application.

Figure 2:
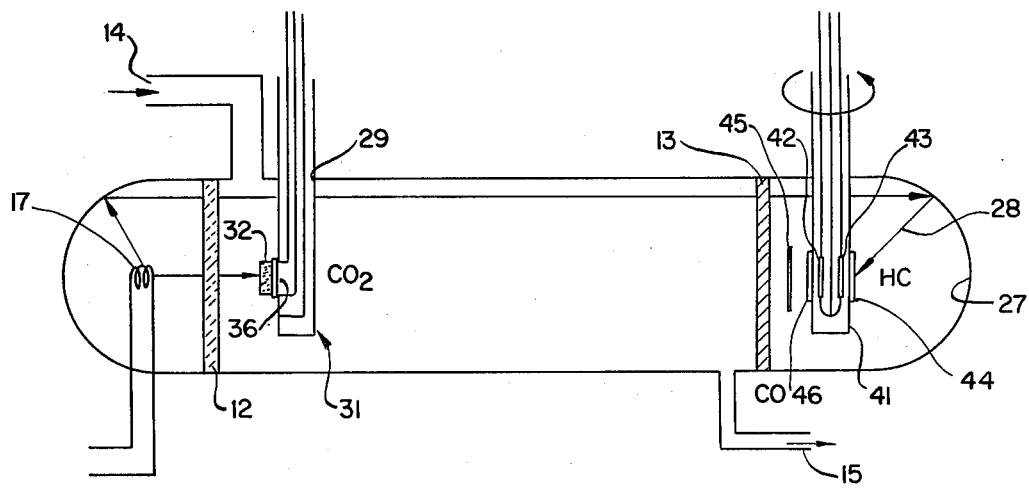

As shown schematically in FIG. 2, the unit 41 has back-to-back mounted light and dark thermistor flakes 42, 43 connected differentially reversing their roles as light or dark flake according to the angular position of the unit 41, with the flake 43 receiving radiation through a suitable filter 44 from the focusing mirror 27. For preventing direct radiation from the infrared source 17 falling upon the flake 42 which is away from the mirror 27, a shield 45 is mounted between the window 13 and the sensor unit 41 as described in the aforesaid copending application Ser. No. 491,672.

Although we have herein shown and described our invention in what we have construed to be the most practical and preferred embodiments, it is recognized that departures may be made therefrom within the scope of our invention, which is not limited to the details disclosed herein but embraces any and all equivalent structures, methods and devices.

What is claimed is:

1. An optical bench for separate detection of two molecular constituents in a sample gas by determination of absorption of radiant energy passed through the sample, said bench comprising in combination:
   a chamber enclosing a longitudinally extending sample cell having first and second ends,
   a source of radiant energy mounted at the first end of the cell,
   first and second windows transparent to the radiant energy at the first and second ends of the cell and enclosing the cell at the ends to form an elongated gas-containing cell with first and second ends,
   a first sensor in the chamber at the first end of the cell, the first window being between the radiant energy source and the first sensor,
   a second sensor at the second end of the sample cell, the second window being mounted between the gas-containing cell and the second sensor, the chamber having sample inlet and outlet openings at the ends thereof, the sensors being selectively responsive to two different molecular sample gas constituents, whereby radiant energy passing through the first window affects the first sensor, radiant energy passing through both windows affects the second sensor to produce simultaneous indications by the sensors of two different constituents of the sample gas.

2. The optical bench defined in claim 1 wherein a reflector is mounted at the second end of the cell in suitable positional relationship to the second sensor for concentrating radiation from the radiant energy source upon the second sensor, whereby the first sensor receives radiation directly from the radiant energy source through the first window and the second sensor receives radiation from the radiant energy source by reflection.

3. The optical bench defined in claim 2 wherein the second sensor is provided with a shield for shielding it from direct radiation from the radiant energy source.

4. The optical bench defined in claim 3 wherein the radiation sensors comprise first and second holders forming first and second enclosures, each having an opening therein with a radiation selective filter in the opening and first and second radiation detectors within the first and second enclosures, each adjacent a filter, each filter having the property of selectively passing radiant energy related to the energy absorption characteristics of a gaseous constituent which is to be detected whereby the sensors are rendered selectively responsive to the two different constituents.

5. The optical bench defined in claim 4 wherein the source of radiant energy is a source of infrared radiation, the windows at the ends of the optical bench have the property of transmitting infrared radiation, the radiation detectors are thermistors and two appropriate amplifiers are coupled to said thermistors for giving simultaneous indications of the concentration of two different gaseous sample constituents.

6. The optical bench defined in claim 5 wherein the first sensor is mounted relatively close to the first window in comparison with the distance between infrared windows and the first infrared window is composed of a rigid material to eliminate the effects of window deflection upon the cell path length of infrared radiation received by the first sensor.

7. The optical bench defined in claim 6 wherein the first infrared window is composed of sapphire and the second infrared window is composed of an appropriate plastic material.

8. The optical bench defined in claim 7 wherein the first sensor is responsive to a gaseous constituent having the property of absorbing infrared energy to a substantially greater extend that the constituent to which the second sensor is selectively responsive whereby effective operation will be obtained by having the first sensor relatively close to the first window with the second sensor affected by absorption occurring throughout the full length of the sample gas enclosing chamber.

9. The optical bench defined in claim 8 wherein the first sensor is responsive to carbon dioxide and the second sensor is responsive to carbon monoxide or unburned hydrocarbons.

10. The optical bench defined in claim 4 wherein the second enclosure for the second sensor is provided containing also a third radiation detector, whereby a dual unit is formed, and a rotatable mounting is provided for the dual unit for enabling either the second detector or the third detector to receive reflected radiation from the reflector, the second and third detectors being mounted back to back and the shield being mounted between the second window and the dual unit having rotatable mounting whereby one of the two detectors comprising the second and third detectors is exposed to reflected radiant energy and the other of the two detectors is shielded from direct radiation, the first detector receiving only direct radiation.

11. The optical bench defined in claim 10 wherein the first detector is responsive to absorption of carbon dioxide, the second detector is responsive to absorption of carbon monoxide and the third detector is responsive to absorption of hydrocarbons.

* * * * *